US007560061B2

(12) United States Patent
Yu et al.

(10) Patent No.: US 7,560,061 B2
(45) Date of Patent: Jul. 14, 2009

(54) POLYAMIDE FIBER FOR UNCOATED AIRBAGS

(75) Inventors: Je-An Yu, Seoul (KR); Chang-Hwan Lee, Seoul (KR)

(73) Assignee: HYOSUNG Corporation, Kyonggi-do (KR)

( * ) Notice: Subject to any disclaimer, the term of this patent is extended or adjusted under 35 U.S.C. 154(b) by 0 days.

(21) Appl. No.: 11/979,885

(22) Filed: Nov. 9, 2007

(65) Prior Publication Data

US 2008/0064282 A1 Mar. 13, 2008

Related U.S. Application Data

(62) Division of application No. 10/941,911, filed on Sep. 16, 2004, now abandoned.

(30) Foreign Application Priority Data

Dec. 30, 2003 (KR) ...................... 10-2003-0100190

(51) Int. Cl.
*B29C 55/00* (2006.01)

(52) U.S. Cl. ................. 264/289.6; 264/210.7; 428/364; 428/365

(58) Field of Classification Search ................. 428/364, 428/365, 395; 8/151, 149.3; 139/291 R; 264/289.6, 210, 176.1
See application file for complete search history.

(56) References Cited

U.S. PATENT DOCUMENTS

| | | | |
|---|---|---|---|
| 5,093,163 | A | 3/1992 | Krummheuer et al. |
| 5,508,073 | A | 4/1996 | Krummheuer et al. |
| 5,693,392 | A | 12/1997 | Bergen et al. |
| 5,952,250 | A | 9/1999 | Kim et al. |
| 5,994,243 | A | 11/1999 | Bowen et al. |

FOREIGN PATENT DOCUMENTS

| | | |
|---|---|---|
| EP | 416483 | 9/1990 |
| EP | 436950 | 12/1990 |
| EP | 0 416 483 A | 3/1991 |
| EP | 0 501 295 A | 9/1992 |
| JP | 1-41438 | 2/1989 |
| JP | 2950954 | 6/1991 |
| JP | 4-201650 | 7/1992 |
| JP | 7-252740 | 10/1995 |
| JP | 8-2359 | 1/1996 |
| WO | WO 98/00592 A | 1/1998 |

*Primary Examiner*—Arti Singh-Pandey
(74) *Attorney, Agent, or Firm*—Nixon & Vanderhye P.C.

(57) ABSTRACT

A high strength polyamide fiber consisting of polyamide monofilaments each having a fineness of less than 4 denier and a stress-strain curve where (a) the monofilament elongates less than 5% when subjected to an initial stress of 1.0 g/d, (b) it elongates less than 12% when subjected to a middle stress of 4.5 g/d, and (c) it elongates more than 3% over a tensile strength range from a tensile strength of at least 9.0 d/g to the tensile strength at break of the monofilament, the elongation values being measured at ambient temperature.

10 Claims, 2 Drawing Sheets

1
2
3
4
5
6
7
8
9
10
11

POLYAMIDE FIBER FOR UNCOATED AIRBAGS

This application is a divisional of application Ser. No. 10/941,911 filed Sep. 16, 2004, now abandoned which in turn claims priority of Korean application Serial No. 10-2003-0100190 filed Dec. 30, 2003, the entire content of which is hereby incorporated by reference in this application.

BACKGROUND OF THE INVENTION

1. Field of the Invention

The present invention relates to a polyamide fiber for uncoated airbags, the fineness and stress-strain curve of drawn yarn of which were controlled such that the polyamide fiber can absorb impact energy which occurs instantaneously when the airbags operate. A fabric produced using the inventive polyamide fiber has high tensile strength and high tear strength, so that it will be useful as an uncoated fabric for airbags.

2. Background of the Related Art

Recently, airbags become necessary to secure the safety of passengers and thus their mounting in vehicles is being gradually increased.

The requirements for the airbags include low permeability to ensure their smooth deployment in the event of a collision, high strength to prevent the damage and bursting of the airbags themselves, and flexibility to prevent the abrasion of the passenger's face upon their deployment, and the like. Recently, improvements in foldability and packability of airbag fabrics themselves, and a reduction in costs thereof, also become important factors.

Airbag fabrics are broadly divided into coated fabrics whose surface was coated with resin after weaving, and uncoated fabrics which are used intact after weaving. In view of the maintenance of low permeability as described above, the uncoated fabrics are generally advantageous for use in the airbags.

There have been many technologies to realize airbags which have excellent foldability and are packed at reduced volume without deteriorating the high strength and low permeability suitable for the airbags. For this purpose, for example, Japanese patent laid-open publication No. Heisei 1-41438 discloses producing an airbag fabric using a yarn strand made of fibers with a tenacity of at least 8.5 g/d and a monofilament fineness of less than 3 deniers. Although this publication discloses nothing regarding the difference between coated fabrics and uncoated fabrics, the airbag fabric disclosed in this publication are essentially a coated fabric whose surface was coated with elastomer, such as chloroprene rubber. If the technology disclosed in this publication is applied to the uncoated fabric, the strength and packability of the fabric could be surely satisfied, but the maintenance of low air permeability could not be sufficiently satisfied.

Furthermore, Japanese patent laid-open publication No. Heisei 4-201650 discloses a technology of producing an airbag fabric with excellent strength and foldability, in which the airbag fabric is produced using a polyamide multifilament made of a plurality of monofilaments each having a deformed cross-section with a deformation degree of 1.5-7.0, and a monofilament fineness of 1.0-12 deniers. However, if the technology disclosed in this publication is applied to the coated fabrics, the requirements for airbags will be satisfied, but it is applied to the uncoated fabrics, air permeability, particularly at seams, will remain as a problem to be solved.

Technologies regarding the uncoated fabrics include a method described in Japanese patent laid-open publication No. Heisei 7-252740. This publication discloses that flat cross section yarns having a flat ratio of at least 1.5 are used to produce an uncoated fabric for airbags which has low permeability, excellent foldability and excellent packability. However, the uncoated fabric for airbags has an air permeability of more than 0.3 cc/cm$^2$/sec under low pressure (124 Pa), and thus, cannot sufficiently meet the recent requirement of low permeability.

Meanwhile, to meet the US standard FMVSS208 revised in 2000, making an inflator dual is being examined. Since this inflator has two-stage deployment, gas output at the second stage is greater than the output of the prior inflator. For this reason, an air permeability lower than the prior art even under high pressure and a reduction in slippage between a sewing yarn and a fabric at the seams of airbags (hereinafter, referred to as the seam slippage) have been required.

From this point of view, uncoated fabrics produced using yarns with a total fineness of 300-400 dtex as disclosed in Japanese patent No. 2950954 hardly seem to have a sufficiently low seam slippage. Furthermore, Japanese patent laid-open publication No. Heisei 8-2359 discloses airbag fabrics having a weft/warp cover factor of 900-1400, which are characterized by a specified amount of oil remaining therein and specified slippage resistance. However, the fabrics for airbags disclosed in this publication cannot also seem to be sufficient to meet the seam slippage.

U.S. Pat. No. 5,073,418 discloses a method where a cloth is produced using a yarn of less than 500 deniers and then calendered to reduce its air permeability, and thus, to exhibit the effect of an improvement in its air tightness. However, this method is disadvantageous in that the tear strength of the cloth is reduced.

European patent publication No. 416483 discloses a heat-shrinkable or heat-shrunk, uncoated fabric for the production of airbags, in which the fabric is made of a synthetic filament yarn having a substantially symmetrical structure and a fineness of 300-400 dtex. However, a method for producing the fabric disclosed in this publication has a problem in that the strength of the synthetic filament yarn is rapidly lowered during a heat shrinkage process to reduce the tear strength of the fabric.

European patent publication No. 436950 discloses a method for the production of an industrial fabric which has a dense texture and does not need to be coated. In the disclosed method, the fabric made of a polyamide filament yarn having a hot-air shrinkage of 6-15% at 160° C. and at least substantially symmetrical structure is treated in an aqueous bath at a temperature of 60-140° C. However, this method has a problem in that the heat shrinkage of the synthetic filament yarn rapidly occurs in the aqueous bath of high temperature so that the quality of the fabric is lowered and the tear strength of the cloth is reduced.

In the present invention, the tear strength of a final fabric could be increased by controlling the fineness and stress-strain curve of a drawn yarn, such that the fabric can absorb impact energy which occurs instantaneously when an airbag operates.

Furthermore, the present invention provides an uncoated fabric for airbags, which has high strength and excellent packability as a result of a reduction in the monofilament fineness of a polyamide multifilament and an increase not only in the orientation uniformity of a drawn yarn but also in the formation of tie chains interconnecting crystals.

SUMMARY OF THE INVENTION

Accordingly, an object of the present invention is to provide a polyamide fiber, the fineness and stress-strain curve of the monofilaments of which were controlled such that the polyamide fiber can absorb impact energy occurring instantaneously when airbags operate. More particularly, an object of the present invention is to provide a high strength polyamide fiber consisting of polyamide monofilaments each having a fineness of less than 4 denier and a stress-strain curve where (a) the polyamide monofilament elongates less than 5% when subjected to an initial stress of 1.0 g/d, (b) it elongates less than 12% when subjected to a middle stress of 4.5 g/d, and (c) it elongates more than 3% over a tensile strength range from a tensile strength of at least 9.0 g/d to the tensile strength at break of the monofilament yarn, the elongation values being measured at ambient temperature.

A fabric produced using the inventive high strength polyamide fiber has high tensile strength and high tear strength and thus will be useful as uncoated fabric for airbags.

To achieve the above object, in one aspect, the present invention provides a polyamide monofilament which has a fineness of less than 4 denier and a stress-strain curve where (a) the polyamide monofilament elongates less than 5% when subjected to an initial stress of 1.0 g/d, (b) it elongates less than 12% when subjected to a middle stress of 4.5 g/d, and (c) it elongates more than 3% over a tensile strength range from a tensile strength of at least 9.0 g/d to the tensile strength at break of the monofilament yarn, the elongation values being measured at ambient temperature.

The inventive polyamide monofilament preferably has a tensile strength at break of 9.0-11 g/d.

Also, the inventive polyamide monofilament preferably has a fineness of 2-3.5 denier.

In another aspect, the present invention provides a polyamide multifilament for uncoated airbags, which consists of a assembly of the inventive polyamide monofilaments.

The number of the polyamide monofilaments in the polyamide monofilament assembly is preferably 50-500, and more preferably 136.

The inventive polyamide multifilament preferably has a total fineness of 200-800 denier.

In still another aspect, the present invention provides an uncoated fabric for airbags, which is produced by a method comprising the steps of: (A) weaving the inventive polyamide multifilament into a grey fabric for airbags; (B) heat-shrinking the grey fabric by successively passing it through 3-10 aqueous baths in which the temperature of each of the aqueous baths is 5-20° C. higher than that of the preceding aqueous bath; and (C) drying the heat-shrunk fabric by passing it through a hot air drier.

In the inventive method for producing the uncoated fabric for airbags, the step (B) is preferably performed by passing the grey fabric through an aqueous bath with a temperature of 50° C. and then successively passing the grey fabric through 5 aqueous baths in which the temperature of each of the aqueous baths is 10° C. higher than that of the preceding aqueous bath.

Preferably, the step of heat-shrinking the grey fabric passed through the aqueous baths is additionally heat-shrunk by successively passing through a steam heater with a temperature of 150-220° C.

Also, in the step (C), a fabric inlet of the hot air drier is preferably set to a temperature of 140-160° C., and a fabric outlet of the hot air drier is preferably is set to about 30-70° C. higher temperature than that of the fabric inlet.

Moreover, the uncoated fabric for airbags produced by the present invention preferably has a tensile strength of 200-300 kg.

Furthermore, the uncoated fabric for airbags produced by the present invention has a tear strength of 25-40 kg.

In addition, the inventive uncoated fabric for airbags preferably has an air permeability of less than 1.0 $cm^3/cm^2/sec$.

DETAILED DESCRIPTION OF THE PREFERRED EMBODIMENT

Figure 1:
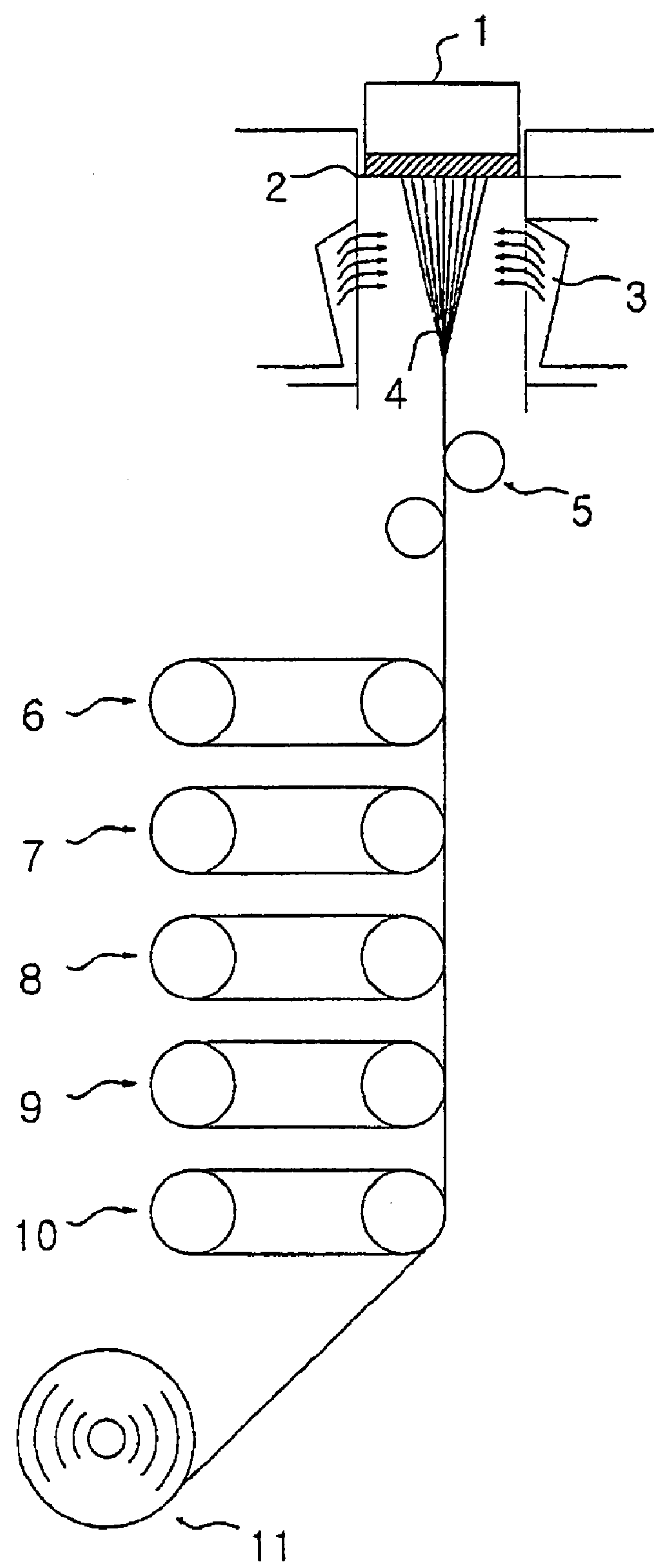
FIG. 1 is a schematic diagram showing a process for spinning and drawing the inventive polyamide fiber.
Figure 2:
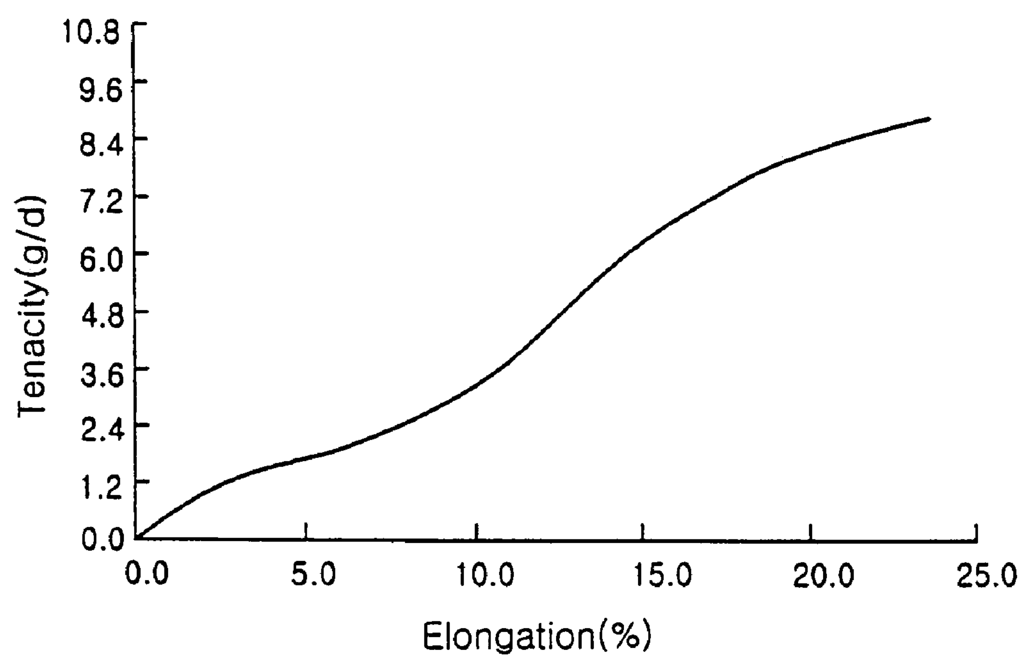
FIG. 2 is a graph showing an example of a stress-strain curve for a polyamide monofilament produced by the present invention.

A polyhexamethyleneadipamide polymer used in the present invention contains at least 85 mol % of hexamethylene adipamide repeat units, and preferably consists only of the hexamethylene adipamide repeat units.

In the present invention, polyamide homopolymer and copolymer may be used in a substitute for the polyhexamethyleneadipamide polymer. Such polyamides are mainly aliphatic. Nylon polymers, such as poly(hexamethylene adipamide) (nylon 66), poly(ϵ-caproamide) (nylon 6) and a copolymer thereof, etc., can be preferably used. Nylon 66 is most preferably used. Other nylon polymers which can be advantageously used include nylon 12, nylon 46, nylon 6/10, nylon 6/12 and the like.

For an improvement in thermal stability, the polyhexamethyleneadipamide polymer used in the present invention is preferably added in such an amount that the amount of copper metal remaining in the final polymer is 10-80 ppm. If the amount of copper metal remaining in the final polymer is less than 10 ppm, the thermal stability of the polymer upon spinning will be reduced to cause the thermal decomposition of the polymer. On the other hand, it exceeds 80 ppm, excessive copper metals will act as a foreign material to cause undesirable effects upon spinning.

The polyhexamethyleneadipamide polymer is spun into a fiber according to the method for the production of the high strength polyamide fiber of the present invention. FIG. 1 schematically shows a producing process of polyamide fiber according to one preferred embodiment of the present invention.

In the method for the production of the high strength polyamide fiber of the present invention, the polyhexamethyleneadipamide polymer is melt-spun through a spinning pack 1 and nozzles 2 at a spinning draft ratio (the linear velocity on a first winding roller/the linear velocity in nozzles) of 20-200 at a relatively low temperature of 270-320° C. to prevent its viscosity decrease caused by its thermal decomposition. When the spinning draft ratio is below 20, the uniformity of the filament cross-section will be reduced to remarkably deteriorate the drawing workability of the polymer, whereas if it exceeds 200, filament breakage occurs during spinning and thus it will be difficult to produce a normal yarn.

Furthermore, it is critical to the present invention that the residual time of the polymer in the spinning pack is adjusted to 3-30 seconds. If the residual time in the spinning pack is shorter than 3 seconds, the filtration of foreign materials will be insufficient, whereas if it is longer than 30 seconds, an excessive increase in pressure of the spinning pack will occur to cause the excessive thermal decomposition of the polymer.

Moreover, in the present invention, the length/diameter (L/D) ratio of an extruder screw preferably ranges from 10 to 40. If the L/D of the screw is below 10, it will be difficult to achieve the uniform melting of the polymer, whereas if it exceeds 40, excessive shear stress will occur to cause an excessive reduction in molecular weight of the polymer and the physical properties of the polymer will be deteriorated.

In the present invention, the melt-spun yarn 4 is quenched and solidified by passing it through a cooling zone 3. In the cooling zone 3, a quenching method which is selected from open quenching, circular closed quenching, radial outflow quenching and the like depending on a blowing method of cooling air can be applied. The open quenching method is preferably used.

Then, the spun yarn 4, which was solidified by passing through the cooling zone 3, may be oiled to 0.5-3.0% by an oil-feeding roller 5.

In the method for the production of the high strength polyamide fiber of the present invention, the undrawn yarn is preferably taken up at a rate of 200-1,000 m/minute.

The technical core of the present invention is to control the monofilament fineness of an undrawn yarn to 10-25 denier which is smaller than that of the prior art. In the prior art, the monofilament fineness of an undrawn yarn generally exceeds 25 denier, in which case the uniform cooling of the undrawn yarn is difficult since the fineness of the undrawn yarn is too large. That is, the damage of the yarn is caused in a high-ratio drawing process due to a difference in cooling between the surface and inner part of the undrawn yarn. Also, if the monofilament fineness of the undrawn yarn is controlled to less than 10 denier, the number of filaments of the undrawn yarn will be excessively increased, resulting in deterioration in spinning process stability.

In the method for the production of the high strength polyamide fiber of the present invention, the yarn passed through the first drawing roller 6 is passed through a series of drawing rollers 7, 8, 9 and 10 by a multistage drawing process so that it is drawn to a total draw ratio of at least 4.0, and preferably 4.5-6.5, to form a final drawn yarn 11.

The multi-stage drawing process according to the present invention consists of: first and second drawing stages which are carried out at low temperature; and a third drawing stage which is carried out at high temperature to a relatively low draw ratio. The polyamide monofilament produced by such an inventive three-stage drawing process has a stress-strain curve where (a) the polyamide monofilament elongates less than 5% when subjected to an initial stress of 1.0 g/d, (b) it elongates less than 12% when subjected to a middle stress of 4.5 g/d, and (c) it elongates more than 3% over a tensile strength range from a tensile strength of at least 9.0 g/d to the tensile strength at break of the monofilament yarn.

In the first and second drawing stages of the inventive drawing process, crystallization by orientation mainly occurs. The first drawing stage is performed at drawing temperature of 20-50° C. to a draw ratio of 1.05-1.5. In this first drawing stage, a drawing temperature below 20° C. is economically disadvantageous since it is difficult to maintain a drawing temperature below 20° C. unless an additional cooling device is mounted on drawing rollers. Also, a drawing temperature above 50° C. is undesirable as it causes thermal crystallization. Also, at a draw ratio of more than 1.5, excessive tensile strength is imparted to the yarn being drawn.

The second drawing stage of the inventive drawing process is preferably performed at a drawing temperature of 50-90° C., the grass transition temperature of polyamide, to a draw ratio of 2.5-3.5. In this second drawing stage, a drawing temperature below 50° C. is undesirable since it results in a reduction in drawability, and a drawing temperature above 90° C. is undesirable as it causes thermal crystallization.

In the third drawing stage of the inventive drawing process, thermal crystallization at high temperature occurs. This third drawing stage is preferably performed at a drawing temperature of 200-250° C. to a draw ratio of less than 2.0. In the third drawing stage, a drawing temperature below 200° C. is undesirable since sufficient thermal crystallization does not occur, and a drawing temperature above 250° C. causes damages to the yarn. Also, a draw ratio of more than 2.0 will result in a rapid reduction in the elongation of the yarn.

Furthermore, the surface roughness of the drawing rollers 7, 8, 9 and 10 is adjusted to 2-3 μm such that the damage of the yarn by friction with the rollers can be minimized.

The inventive polyamide fiber has a dry heat shrinkage of 3-8% (at 190° C. for 15 minutes), and this low yarn shrinkage is achieved by a relaxation process for stabilizing the crystal structure of the drawn yarn. The relaxation process is performed following the three-stage drawing process, and carried out at a relaxation temperature of 200-260° C. to a relaxation ratio of 2-7%. In this relaxation process, at a relaxation temperature below 200° C., the sufficient thermal stabilization of the crystal structure is difficult, and at a relaxation temperature above 260° C., the thermal damage of the yarn is caused. Furthermore, at a relaxation ratio of less than 2%, the shrinkage of the yarn is increased such that the strength of the yarn is severely reduced in a shrinkage process following a weaving process. At a relaxation ratio of more than 7%, the shaking of the yarn in a drawing process becomes severe.

The polyamide fiber produced by the inventive thermal drawing process at high draw ratio has low convergence due to high strength and elasticity. In order to overcome this problem, the polyamide fiber is passed through interlace nozzles before or after the relaxation process following the three-stage drawing process. In order to increase an interlace effect, various types of interlace nozzles may be used. In this case, not only the tensile strength of the yarn before or after the interlace nozzles but also the pressure of air supplied through both holes of the interlace nozzles act as important factors to determine the quality of the yarn. In the present invention, the relaxation tensile strength of the yarn is maintained at the minimum, and the pressure of air from the interlace nozzles is maintained at 0.5-4 kg/cm$^2$. In this case, at an air pressure of less than 0.5 kg/cm$^2$, the polyamide fiber is not sufficiently interlaced, and at an air pressure of more than 4 kg/cm$^2$, excessive tensile strength and twisting is imparted to the polyamide fiber, resulting in a reduction in the strength of the polyamide fiber. In addition, if the polyamide fiber is passed through the interlace nozzles after treatment with oil, an oil dispersion effect will be obtained.

The technical core of the present invention is to control the stress-strain curve of the polyamide monofilament, in order to absorb impact energy which occurs instantaneously when airbags operate. The inventive polyamide monofilament preferably has a stress-strain curve where the polyamide monofilament elongates less than 5% when subjected to an initial stress of 1.0 g/d, it elongates less than 12% when subjected to a middle stress of 4.5 g/d, and it elongates more than 3% over a tensile strength range from a tensile strength of at least 9.0 g/d to the tensile strength at break of the monofilament yarn, the elongation values being measured at ambient temperature.

In order that the instantaneous impact energy of exhaust gas generated by the explosion of explosives within an airbag is safely absorbed into a fabric in an initial stage, high initial modulus of a yarn is required. The inventive polyamide monofilament preferably has a stress-strain curve where it elongates less than 5% when subjected to an initial stress of 1.0 g/d. If the polyamide monofilament elongates more than 5% when subjected to an initial stress of 1.0 g/d, the fabric made of the polyamide monofilaments will be deformed rapidly, thus causing initial damages to the fabric.

Furthermore, the inventive polyamide monofilament preferably elongates less than 12% when subjected to a middle stress of 4.5 g/d. If the monofilament elongates more than 12% at a middle stress of 4.5 g/d, the air permeability of the fabric will be increased rapidly so that the human body gets burned due to exhaust gas from an airbag.

In order to increase the tensile strength and tear strength of a fabric and thus minimize the thickness and increase packability of the fabric, it is preferred that the inventive polyamide monofilament elongates more than 3% over a tensile strength range from a tensile strength of at least 9.0 g/d to the tensile strength at break of the monofilament yarn. If the polyamide monofilament yarn elongates less than 3% over a tensile strength range from a tensile strength of at least 9.0 g/d to the tensile strength at break of the monofilament yarn, its ability to absorb maximum tensile strength will be insufficient. Thus, if the monofilament yarn is woven into a low-weight fabric, it will have insufficient tensile strength and tear strength.

The inventive polyamide monofilament has a fineness of less than 4 denier, preferably 2-3.5 denier. The inventive polyamide monofilament preferably has a tensile strength at break of 9.0-11 g/d. The inventive polyamide multifilament consists of a assembly of the inventive polyamide monofilaments. The number of the polyamide monofilaments in the polyamide monofilament assembly is preferably 50-500, and more preferably 136. And, the inventive polyamide multifilament preferably has a total fineness of 200-800 denier.

The high strength polyamide fiber produced by the inventive method is woven in a plain weave configuration at typically 25-33 yarns/cm in all warp and weft yarns for 210 denier polyamide yarns, 14-25 yarns/cm in all warp and weft yarns for 420 denier polyamide yarns, and 11-20 yarns/cm in all warp and weft yarns for 630 denier polyamide yarns, using a Rapier loom or water-jet loom weaving machine, such that the low air permeability requirement is accomplished.

Although the high strength polyamide fiber produced by the inventive method is preferably woven into a plain fabric with a symmetric structure, it may also be woven into a 2/2 Panama fabric with a symmetric structure using yarn which has thinner linear density in order to obtain an attractive fabric.

The uncoated fabric for airbags according to the present invention is characterized in that it is produced by the following steps:

(A) weaving the polyamide multifilament produced by the present invention into a grey fabric for airbags;

(B) heat-shrinking the grey fabric by successively passing it through 3-10 aqueous baths in which the temperature of each of the aqueous baths is 5-20° C. higher than that of the preceding aqueous bath; and (C) drying the heat-shrunk fabric by passing it through a hot air drier.

In order to prevent a loss in quality and a reduction in strength of a fabric due to the rapid shrinkage of the grey fabric, which occurs in aqueous baths with high temperature (90-100° C.) during a refining process, the present invention comprises slowly increasing the temperature of the aqueous baths. In a preferred embodiment of the present invention, the grey fabric is passed through an aqueous bath with a temperature of 50° C., and then continuously passed through five aqueous baths in which the temperature of each of the aqueous baths is 10° C. higher than that of the preceding aqueous bath.

In the step (C) of the method for production of the uncoated fabric for airbags of the present invention, the fabric inlet of the hot air drier preferably has a temperature of 140-160° C., and the temperature of the fabric outlet is preferably about 30-70° C. higher than that of the fabric inlet.

Alternately, in order to produce an uncoated fabric with sufficiently low air permeability, the refined fabric is additionally shrunk using a steam heater at a temperature of 150-220° C. In this case, the heat shrinkage rate of the fabric by the steam heater is preferably about 10-40% relative to the total heat shrinkage of the fabric.

The uncoated fabric for airbags produced by the inventive method has a tensile strength of 200-300 kg, a tear strength of 25-40 kg, and an air permeability of less than 1.0 $cm^3/cm^2/sec$.

As described above, the present invention provides a polyamide fabric for airbags, in which the fineness and stress-strain curve of the high strength polyamide monofilament constituting the fabric were controlled such that impact energy which occurs instantaneously when the airbags operate can be absorbed into the fabric.

The following Examples are given for the purpose of illustration only, and are not intended to limit the scope of the invention. The physical properties of yarns and fabrics produced in Examples and Comparative Examples were evaluated in the following manners.

(1) Relative Viscosity (R.V.)

0.1 g of a sample was dissolved in sulfuric acid (90%) for 90 minutes to a concentration of 0.4 g/100 ml. The solution was put in an Ubbelohde viscometer and kept in a 30° C. incubator for 10 minutes. The dropping time (sec) of the sample as well as that (sec) of the solvent were measured using a viscometer and an aspirator, and RV values were calculated based on the following formula:

RV=dropping time (sec) of the sample/dropping time (sec) of the solvent (2) Strength and Elongation A sample was kept under a standard atmosphere (20° C. and 65% relative humidity) for 24 hours and then its strength and elongation were measured in accordance with ASTM D 885 at a sample length of 250 mm, a tensile speed of 300 mm/min and 20 turns/m, using Instron 5565 (Instron Co., Ltd, USA).

(3) Dry Heat Shrinkage

A sample was kept under a standard atmosphere (20° C. and 65% relative humidity) for 24 hours and then its length ($L_0$) at 0.1 g/d load was measured. The sample was kept in a 190° C. dry oven for 15 minutes under a non-tension condition, and left outdoors for 4 hours, and then its length (L) at 0.1 g/d load was measured. The shrinkage (%) of the sample was calculated from the following formula:

$$\Delta S(\%)=(L_0-L)/L_0\times 100$$

(4) Tensile Strength of Fabric

A fabric that is 10 cm wide and 15 cm long was kept under a standard atmosphere (20° C. and 65% relative humidity) for 24 hours, and then its tensile strength was measured in accordance with ASTM D 5034, using Instron 4465 (Instron Co., Ltd, USA).

(5) Tear strength of Fabric

A fabric was kept under a standard atmosphere (20° C. and 65% relative humidity) for 24 hours, and then its tear strength was measured in accordance with ASTM D 2261 (tongue), using Instron 4465 (Instron Co., Ltd, USA).

(6) Air Permeability of Fabric

The air permeability of a fabric was measured in accordance with ASTM D 737 under a pressure of 125 Pa using a Frazier air permeability tester.

(7) Birefringence

The birefringence of a sample was measured using a polarizing microscope equipped with a Berek compensator.

EXAMPLE 1

A polyhexamethyleneadipamide polymer having a relative viscosity of 3.5 and containing 40 ppm of copper metal was melt-spun in an extruder at a temperature of 295° C. to a spinning draft ratio of 40. At this time, the residual time of the polymer in a spinning pack was 12 seconds, a screw in the extruder used was adjusted to an L/D ratio of 31, and the polymer being melt-spun was uniformly mixed in a static mixer with three mixing units disposed in a polymer conduit of the spinning pack. Then, the spun yarn was solidified by passing through a cooling zone with a length of 600 mm (open cooling chamber; blown with cooling air at 20° C. and a rate of 0.6 m/sec), followed by treatment with spinning oil. The undrawn yarn was taken up at a rate of 470 m/minute and subjected to three-stage drawing. The first stage drawing was performed at 25° C. to a draw ratio of 1.2, the second stage drawing was performed at 70° C. to a draw ratio of 3.0, and the third stage drawing was performed at 215° C. to a draw ratio of 1.7. Then, the drawn yarn was heat-set at 235° C., relaxed to 4% and wound, thus producing a final drawn yarn having a fineness of 315 d/136 f. The spinning and drawing conditions are given in Table 1 below. The physical properties of the produced drawn yarn were evaluated and the results are shown in Table 2 below.

EXAMPLES 2-5 AND COMPARATIVE EXAMPLES 1-4

Drawn yarns were produced in the same manner as described in Example 1 except that fineness, spinning temperature and drawing conditions were changed as shown in Table 1. The spinning and drawing conditions are given in Table 1 below. The physical properties of the drawn yarns produced as such were evaluated and the results were shown in Table 2.

TABLE 1

| | Specification | Relative viscosity of chip | Spinning temperature (° C.) | Monofilament fineness of undrawn yarn(denier) | Drawing ratio $1^{st}/2^{nd}/3^{rd}$ | Drawing temperature(° C.) $1^{st}/2^{nd}/3^{rd}$ |
|---|---|---|---|---|---|---|
| Example 1 | 315d/136f | 3.5 | 295 | 13.7 | 1.2/3.0/1.7 | 25° C./70° C./215° C. |
| Example 2 | 420d/136f | 3.5 | 295 | 18.2 | 1.2/3.0/1.7 | 25° C./70° C./215° C. |
| Example 3 | 630d/200f | 3.5 | 295 | 18.6 | 1.2/3.0/1.7 | 25° C./70° C./215° C. |
| Example 4 | 210d/68f | 3.5 | 295 | 18.2 | 1.2/3.0/1.7 | 25° C./70° C./215° C. |
| Example 5 | 315d/100f | 3.5 | 295 | 18.6 | 1.2/3.0/1.7 | 25° C./70° C./215° C. |
| Comparative Example 1 | 630d/136f | 3.5 | 295 | 27.8 | 1.0/2.0/3.1 | 25° C./100° C./225° C. |
| Comparative Example 2 | 630d/100f | 3.5 | 295 | 37.8 | 1.0/2.0/3.1 | 25° C./100° C./225° C. |
| Comparative Example 3 | 420d/68f | 3.5 | 295 | 37.1 | 1.0/2.0/3.1 | 25° C./100° C./225° C. |
| Comparative Example 4 | 210d/34f | 3.5 | 295 | 37.1 | 1.0/2.0/3.1 | 25° C./100° C./225° C. |

TABLE 2

| | Drawn yarn | | | | | | | |
|---|---|---|---|---|---|---|---|---|
| | | | | | | Monofilament yarn | | |
| | Monofilament fineness (denier) | Dry heat shrinkage(%) (190° C. × 15 min) | Tenacity | Elongation | Birefringence | Elongation at 1.0 g/d(%) | Elongation at 4.5 g/d(%) | Elongation from 9.0 g/d to the break of the monofilament yarn(%) |
| Example 1 | 2.3 | 6.7 | 9.8 | 25.8 | 0.063 | 2.9 | 11.5 | 4.1 |
| Example 2 | 3.1 | 6.1 | 9.9 | 24.0 | 0.061 | 3.1 | 11.4 | 4.1 |
| Example 3 | 3.2 | 5.9 | 10.0 | 24.6 | 0.062 | 2.8 | 11.2 | 4.2 |
| Example 4 | 3.1 | 7.1 | 10.1 | 26.4 | 0.063 | 2.8 | 11.1 | 4.3 |
| Example 5 | 3.2 | 7.1 | 10.1 | 26.4 | 0.064 | 2.7 | 11.2 | 4.2 |
| Comparative Example 1 | 4.6 | 9.1 | 9.1 | 23.8 | 0.069 | 5.3 | 13.1 | 2.5 |
| Comparative Example 2 | 6.3 | 8.8 | 9.2 | 22.1 | 0.068 | 5.2 | 12.8 | 2.6 |
| Comparative Example 3 | 6.2 | 9.4 | 9.2 | 22.6 | 0.067 | 5.2 | 12.9 | 2.7 |
| Comparative Example 4 | 6.2 | 8.2 | 9.6 | 24.4 | 0.068 | 4.3 | 12.5 | 2.3 |

EXAMPLE 6

The grey yarn produced in Example 2 was plain-woven with a rapier weaving machine into a fabric of 49×49 per inch, thus producing a grey fabric for airbags. In a refining process, the grey fabric was first passed through an aqueous bath with a temperature of 50° C., and then successively passed through 5 aqueous baths in which the temperature of each of the aqueous baths was 10° C. higher than that of the preceding aqueous bath. At this time, the temperature of the last aqueous bath was 100° C. Following the refining process, the fabric was additionally heat-shrunk by passing through a steam heater. The temperature of the steam heater was 160° C. Then, the fabric passed through the steam heater was dried in a hot air drier which has a temperature of 150° C. at fabric inlet and a temperature of 190° C. at fabric outlet.

The physical properties of the fabric produced as such were evaluated and the results are shown in Table 3 below.

COMPARATIVE EXAMPLE 5

The grey yarn produced in Comparative Example 3 was plain-woven with a rapier weaving machine into a fabric of 49×49 per inch, thus producing a grey fabric for airbags. In a refining process, the grey fabric was first passed through an aqueous bath with a temperature of 50° C., and then successively passed through 5 aqueous baths in which the temperature of each of the aqueous baths was 10° C. higher than that of the preceding aqueous bath. At this time, the temperature of the last aqueous bath was 100° C. Following the refining process, the fabric was additionally heat-shrunk by passing through a steam heater. The temperature of the steam heater was 190° C. Then, the fabric passed through the steam heater was dried in a hot air drier which has a temperature of 150° C. at fabric inlet and a temperature of 190° C. at fabric outlet.

The physical properties of the fabric produced as such were evaluated and the results are shown in Table 3 below.

COMPARATIVE EXAMPLE 6

The grey yarn produced in Example 2 was plain-woven with a rapier weaving machine into a fabric of 49×49 per inch, thus producing a grey fabric for airbags. The grey fabric was heat-shrunk rapidly by passing through an aqueous bath with a temperature of 95° C., followed by drying in a hot air drier which has a temperature of 150° C. at fabric inlet and a temperature of 190° C. at fabric outlet.

The physical properties of the fabric produced as such were evaluated and the results are shown in Table 3 below.

COMPARATIVE EXAMPLE 7

The grey yarn produced in Example 2 was plain-woven with a rapier weaving machine into a fabric of 49×49 per inch, thus producing a grey fabric for airbags. The grey fabric was heat-shrunk at 175° C. under a pressure of 480 kPa using a calendering device, thus producing a fabric.

The physical properties of the fabric produced as such were evaluated and the results are shown in Table 3 below.

TABLE 3

| | Fitness of yarn | Density of fabric (strand/inch) | Tensile strength (kg) | Tear strength (kg) | Thickness (nm) | Air permeability ($cm^2/cm^2/sec$) | Weight ($g/m^2$) |
|---|---|---|---|---|---|---|---|
| Example 6 | 420d/136f | 49 × 49 | 269 × 251 | 33.5 × 29.3 | 0.35 | 0.8 | 231 |
| Comparative Example 5 | 420d/68f | 49 × 49 | 221 × 213 | 22.5 × 20.1 | 0.40 | 1.6 | 237 |
| Comparative Example 6 | 420d/136f | 49 × 49 | 211 × 201 | 18.5 × 17.3 | 0.39 | 1.9 | 235 |
| Comparative Example 7 | 420d/136f | 49 × 49 | 205 × 188 | 17.5 × 17.1 | 0.38 | 2.4 | 235 |

As described above, the present invention provides the high strength polyamide multifilament consisting of the polyamide monofilaments each having a fineness of less than 4 denier and a stress-strain curve for absorbing impact energy which occurs instantaneously when an airbag operates.

Furthermore, according to the present invention, an uncoated grey fabric for airbags is produced using the high strength polyamide multifilament produced by the present invention, so that an uncoated fabric for airbags, which has high tensile strength, high tear strength and low weight leading to excellent packability, is provided.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An airbag constructed of a fabric woven from a polyamide monofilament produced by a process of:

(A) melt-spinning polyhexamethyleneadipamide polymer at a spinning draft ratio of 20-200 with a residual time of the polymer adjusted to 3-30 seconds to thereby prepare the undrawn yarn having a fineness of 10 to 25; and (B) a multi-stage drawing process where the second drawing ratio is higher than the first drawing ratio and the third drawing ratio is lower than the second, wherein the polyamide monofilament has a fineness of less than 4 denier and a stress-strain curve where (a) the polyamide monofilament elongates less than 5% when subjected to an initial stress of 1.0 g/d, (b) it elongates less than 12% when subjected to a middle stress of 4.5 g/d, and (c) it elongates more than 3% over a tensile strength range from a tensile strength of at least 9.0 g/d to the tensile strength at break of the monofilament yarn, the elongation values being measured at ambient temperature, wherein the (a), (b) and (c) is adjusted within the above range for absorbing impact energy occurring instantaneously when the airbag operates.

2. The airbag of claim 1, in which the polyamide monofilament has a tensile strength at break of 9.0-11 g/d.

3. The airbag of claim 1, in which the polyamide monofilament has a fineness of 2-3.5 denier.

4. An airbag constructed of a fabric woven from an assembly of the polyamide monofilaments of claim 1.

5. The airbag of claim 4, wherein the number of the polyamide monofilaments in the polyamide monofilament assembly is 50-500.

6. The airbag of claim 4, wherein the number of the polyamide monofilaments in the polyamide monofilament assembly is 136.

7. The airbag of claim 4, which has a total fineness of 200-800 denier.

8. The airbag of claim 1, wherein the fabric has a tensile strength of 200-300 kg.

9. The airbag of claim 1, wherein the fabric has a tear strength of 25-40 kg.

10. The airbag of claim 1, wherein the fabric has an air permeability of less than 1.0 $cm^3/cm^2/sec$.

* * * * *